UNITED STATES PATENT OFFICE.

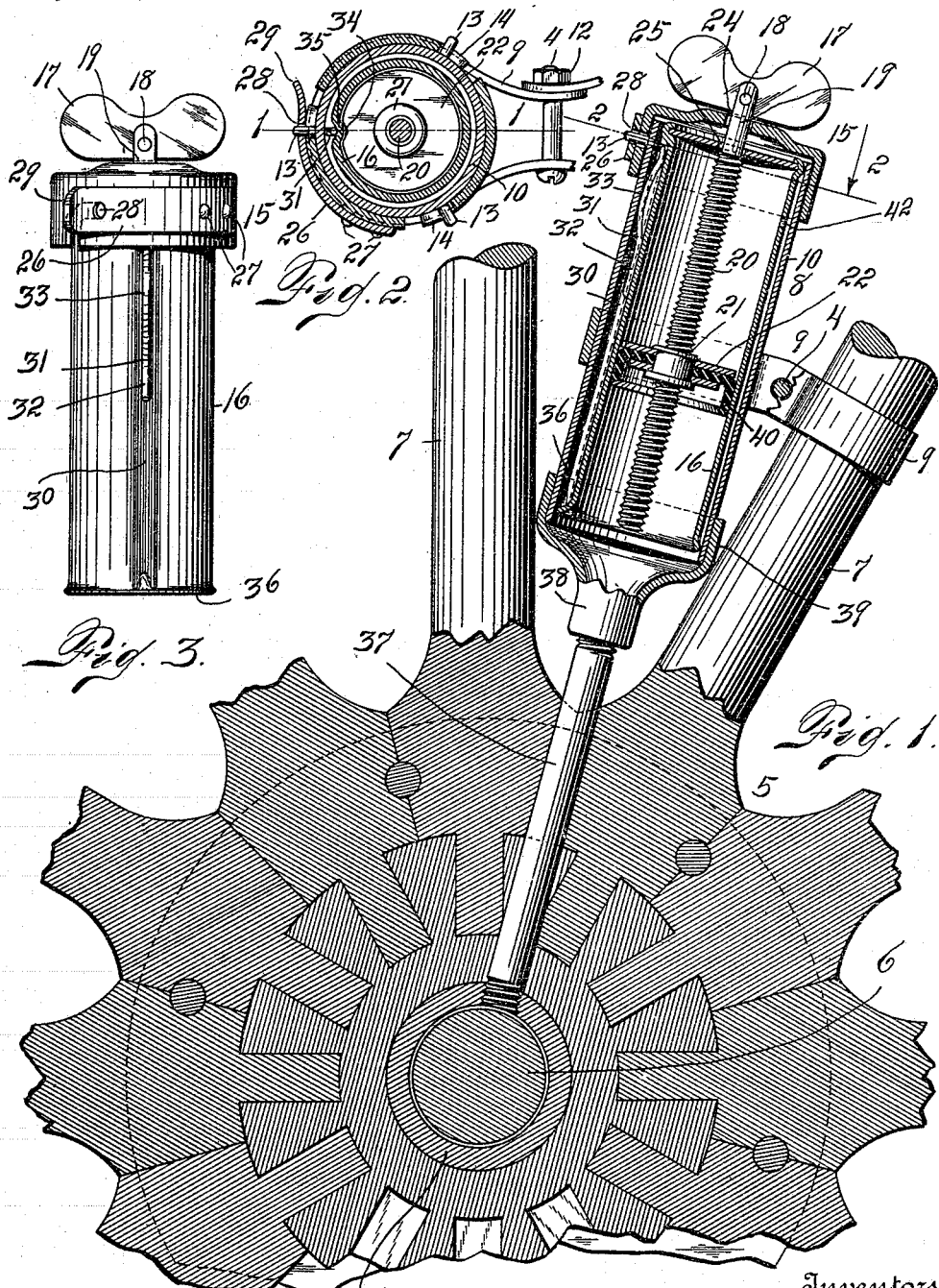

FRANK M. HILL AND FRANK A. HOYT, OF DENVER, COLORADO.

LUBRICATOR.

1,262,793.   Specification of Letters Patent.   Patented Apr. 16, 1918.

Application filed February 28, 1916. Serial No. 80,886.

*To all whom it may concern:*

Be it known that we, FRANK M. HILL and FRANK A. HOYT, citizens of the United States, residing at the city and county of Denver and State of Colorado, have invented certain new and useful Improvements in Lubricators; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in journal lubricators, more especially intended for use in connection with the wheels of vehicles, our object being to provide an article of this class adapted to be mounted upon the wheel and constructed to carry a considerable quantity of lubricating material, the lubricant receptacle being in communication with the journal and fed thereto by the adjustment of a follower located therein, the lubricant being of a relatively hard character.

To be more specific, the construction consists of an outer shell or casing, an inner tube located within the shell and adapted to receive the lubricant, and a plunger or follower located within the tube and threaded on a screw, the said follower being locked against rotary movement within the tube by virtue of a tongue and groove connection between the plunger and tube. Furthermore, the tube is locked against rotation within the shell by means of a spring located within a groove of the tube and bent outwardly into frictional engagement with the inner surface of the shell. The friction between the spring and the shell is such that the screw will turn within the nut of the follower and cause the latter to travel in either direction as desired. In other words, the friction between the said spring carried by the tube, and the shell is greater than the friction between the screw and the nut of the follower. In order to form a lubricant tight joint between the inner open extremity of the tube and the shell, the inner extremity of the tube is flared outwardly whereby it is brought into close contact with the inner surface of the shell. The construction is provided with a cap adapted to engage the upper part of the shell circumferentially and detachably connected therewith, whereby it becomes practicable to remove the tube and the cap from the shell when for any reason it may be necessary so to do. The cap is so connected with the screw that it maintains its position on the screw of the tube when the latter is removed from the shell.

Having briefly outlined our improvement, we will proceed to describe the same more in detail, reference being made to the accompanying drawing, in which is illustrated an embodiment thereof. In this drawing,—

Figure 1 is a vertical cross section taken through the hub of a vehicle wheel and the journal or spindle of the axle, showing our improved lubricating device applied, the latter being also shown in longitudinal section, taken on the line 1—1, Fig. 2.

Fig. 2 is a cross section taken on the line 2—2, Fig. 1.

Fig. 3 is an elevation of the inner lubricant-holding tube shown in detail and with the cap in position thereon.

The same reference characters indicate the same parts in all the views.

Let the numeral 5 designate the hub of a wheel, 6 the spindle or journal of the axle, and 7 the spokes. The body 8 of our improved lubricator, is located between two spokes of the wheel and is secured in place by a band 9 which is passed around the shell 10 of the lubricator and also around one of the spokes 7, the band being locked in place by means of a bolt 4 passed through registering openings formed in the band and the overlapping extremities thereof, the bolt being secured by a nut 12 (see Figs. 1 and 2). The outer shell is open at its upper extremity and is provided as shown in the drawing with three exteriorly projecting pins 13 adapted to coöperate with a corresponding number of angular slots 14 formed in a cap 15 which is loosely mounted on the lubricant-containing tube 16, being held in place thereon by means of a flat vertically disposed plate 17 which is riveted as shown at 18 to the upper extremity 19 of a feed screw 20 which is threaded in a nut 21 formed in the plunger or follower 22. The upper part 19 of the screw passes through an opening 25 formed in the upper extremity 23 of the inner tube, and also through an opening 24 formed in the top of the cap 15. This extremity 19 of the screw extends far enough above the cap to permit the connection of the screw with the plate 17 by means of the rivet or other fastening device 18, as heretofore explained. The cap is also provided with a leaf spring 26 which is secured thereto at one extremity by means of rivets 27. The portion of this spring remote from the rivets is provided with a perforation 28 adapted to receive one of the pins 13 of the shell when the parts of the structure are assembled as shown in Fig. 1. To remove the cap and consequently the tube 16 and its follower from the shell, the free extremity 29 of the spring is sprung outwardly to release its perforation from the pin 13, after which a partial rotation of the cap and an outward pull, will remove the cap from the shell by virtue of the bayonet joint connection heretofore described.
The tube 16 is provided with an exterior longitudinally disposed groove 30 in which is located a spring 31 which is fastened to the tube at one extremity as shown at 32. Above the fastened extremity the spring is bent outwardly as shown at 33, to engage the inner surface of the shell 10 whereby sufficient friction is produced, to permit the rotation of the screw 20 within the nut 21 of the follower, without turning the tube within the shell, the follower being provided with an exterior groove or recess 34 which is engaged by the inwardly projecting part 35 caused by bending the material of the tube inwardly to form the groove 30. This construction prevents the follower from rotating within the tube. Hence, as there is sufficient friction between the portion 33 of the spring, and the shell to prevent the tube from turning within the shell when the screw is rotated, the follower must travel upwardly or downwardly within the tube as may be desired. In order to form a lubricant-tight joint between the lower extremity of the tube and the adjacent portion of the shell, and particularly for the purpose of preventing the lubricant from working upwardly between the tube and the shell where the groove 30 is located, the lower extremity of the tube is flared outwardly as shown at 36 whereby the groove 30 is closed at the lower extremity of the tube. Furthermore, the lower end of the tube is brought into close engagement with the inner surface of the shell around its entire circumference, by the outwardly flared construction just explained. It will be understood that it is important while forcing the lubricant from the tube by the travel of the follower inwardly toward the spindle, that the relation between the lower extremity of the tube and the adjacent portion of the shell, shall be such as to cause the lubricant to pass inwardly to the journal or spindle, through a relatively small pipe or conduit 37 which is connected with the reduced extremity 38 of a funnel-shaped member 39 whose outer portion is brazed or otherwise secured to the inner extremity of the shell. As shown in the drawing, the outer extremity of the pipe 37 is exteriorly threaded to enter interior threads formed in the part 38 of the member 39.

From the foregoing description the use and operation of our improved lubricator will be readily understood. The follower 22 is provided with a cup leather 40 which forms a lubricant-tight joint between the outer surface of the follower and the inner surface of the tube, thus preventing the lubricant within the tube from working outwardly beyond the follower during the inward travel of the latter.

When it is desired to charge the lubricator with lubricant, the inner tube is removed from the shell, by springing the outer extremity 29 of the leaf spring 26 outwardly far enough to release this spring from the corresponding pin 13 of the shell, imparting a partial rotary movement to the cap and pulling outwardly thereon. When the tube is removed from the shell, the follower should be caused to travel to its upward limit the movement on the screw within the tube, after which the tube is inserted in a quantity of relatively hard lubricant a sufficient distance to fill the tube below the follower. The tube is then inserted in the shell and the cap connected with the upper extremity of the shell by virtue of the bayonet joint construction and the spring 36, as heretofore explained. Then by turning the screw 21 in the proper direction by means of the plate 17, the follower or plunger is caused to travel inwardly within the tube toward the spindle, thus forcing a sufficient quantity of lubricant out of the tube and downwardly through the pipe 37, into contact with the outer surface of the spindle or journal 6. The inner extremity of the tube 37 is threaded into the bushing 41 of the hub 6. Whenever it is desired to supply the journal with lubricant, the screw is given a few turns, whereby a corresponding movement is imparted to the follower and the desired quantity of lubricant forced out of the tube and downwardly through the pipe 37 into contact with the outer surface of the spindle or journal, as heretofore explained.

The upper portion of the lubricant-containing tube 16 is provided with a small opening 42 located just below the plunger when the latter is at its outward limit of movement. The object of this opening is to allow the air to escape from the tube during the operation of charging or filling the latter with lubricant.

Having thus described our invention, what we claim is,—

1. In a lubricator, the combination of a shell open at both extremities, a lubricant-containing tube adapted to enter the outer extremity of the shell, a screw journaled in the outer end of the tube which is otherwise closed, the outer extremity of the screw protruding beyond the closure of the tube and being equipped with a hand piece for manipulating purposes, a cap loose on the outer extremity of the screw between the hand piece and the top of the tube, the hand piece being constructed to prevent the removal of the cap from the screw and having a flange adapted to engage the shell on the outside, an interlocking connection between the cap and the shell, and a follower carried by the screw for ejecting the lubricant.

2. A lubricator comprising a shell open at both ends, a lubricant-containing tube adapted to enter the outer extremity of the shell, a screw journaled in the outer end of the tube, a follower mounted on the screw which extends beyond the shell and tube and is equipped with a hand piece, a cap loose on the protruding extremity of the screw between the hand piece and the tube, the hand piece being arranged to prevent the removal of the cap from the screw and tube, and an interlocking connection between the cap and the shell.

3. A lubricator comprising a shell open at both ends, a tube adapted to enter the shell, a screw journaled in the outer extremity of the tube, a follower mounted to travel on the screw as the latter is rotated, a cap loosely attached to the screw, means for preventing the removal of the cap from the screw, and an interlocking connection between the cap and the shell.

4. A lubricator comprising a shell open at both ends, a tube adapted to enter the shell, a screw journaled in the outer end of the tube, a follower mounted to travel longitudinally on the screw as the latter is rotated, a cap loosely attached to the screw, means for preventing the removal of the cap from the screw, and a bayonet joint connection between the cap and the shell.

5. A lubricator comprising a shell open at both ends, a tube adapted to enter the shell, the tube being closed at its outer extremity and open at its inner extremity, a screw journaled in the closed end of the tube, a follower mounted to travel longitudinally on the screw as the latter is rotated, and a cap loosely mounted on the screw above the tube and shell, means for preventing the removal of the cap from the screw, the cap having a spring clip and the shell a pin attached to interlock with the clip for securing the cap in place on the shell.

6. A lubricator comprising a shell open at both ends, a lubricant-containing tube adapted to enter the shell, a screw journaled in the tube, a follower mounted to travel longitudinally on the screw within the tube, a connection between the follower and the tube to prevent the follower from rotating in the tube, the tube having an exterior longitudinally disposed groove, and a spring located in said groove and extending beyond the same into frictional engagement with the shell to prevent the tube from rotating within the shell as the screw is rotated.

7. A lubricator comprising a shell, a lubricant-containing tube adapted to enter the shell and having a longitudinally disposed exterior groove constituting a tongue on the inner side of the tube, a wire spring located in said groove and fixed at one extremity, the free portion extending outwardly into frictional engagement with the shell, a screw journaled in the outer extremity of the tube, and a follower mounted to travel longitudinally on the screw and having a recess adapted to engage said tongue.

8. A lubricator comprising a shell open at both ends, a tube located within the shell and adapted to contain lubricant, a screw journaled in the outer end of the tube, a lubricant-ejecting follower mounted on the screw, the tube having an exterior longitudinally disposed groove, and a correspondingly located interiorly projecting tongue, and a spring located in the groove and extending therefrom into frictional engagement with the shell, the follower being notched to receive the tongue of the tube.

9. A lubricator comprising a shell open at both ends, a tube located within the shell and adapted to contain lubricant, a screw journaled in the outer end of the tube, a lubricant-ejecting follower mounted on the screw, the tube having an exterior longitudinally disposed groove and a correspondingly located interiorly projecting tongue, and a spring located in the groove and extending therefrom into engagement with the shell, the follower being notched to receive the tongue of the tube.

10. A lubricator comprising a shell, a tube located within the shell and adapted to contain lubricant, a screw journaled in the outer end of the tube, a lubricant-ejecting follower mounted on the screw, the tube having an exterior longitudinally disposed groove, and a spring located in the groove and extending therefrom into engagement with the shell.

11. A lubricator comprising a shell, a tube located within the shell and adapted to contain lubricant, a screw journaled in the tube, a lubricant-ejecting follower mounted on the screw, and a spring mounted on the tube and extending therefrom into engagement with the shell.

12. A lubricator comprising a shell, a tube located therein, a connection between the tube and the shell to prevent independent rotation, said connection comprising a spring mounted on one of said last named members and engaging the other member in coöperative relation, a screw journaled in the tube, and a follower mounted to travel on the screw longitudinally for lubricant-ejecting purposes.

In testimony whereof we affix our signatures in presence of two witnesses.
FRANK M. HILL.
FRANK A. HOYT.

Witnesses:
GRACE HUSTON,
A. EBERT O'BRIEN.

Copies of this patent may be obtained for five cents each, by addressing the "Commissioner of Patents, Washington, D. C."